Figure 1:
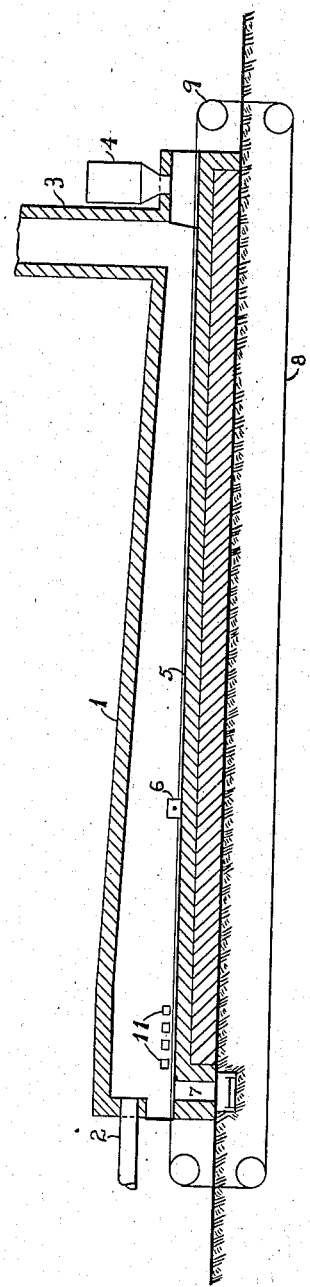

C. ELLIS.
PROCESS OF MANUFACTURING IRON AND STEEL.
APPLICATION FILED OCT. 31, 1905. RENEWED JULY 6, 1908.

911,870.

Patented Feb. 9, 1909.

Witnesses
Warren E. Dixon,
Fred A. Chamberlain

Inventor
Carleton Ellis

UNITED STATES PATENT OFFICE.

CARLETON ELLIS, OF WHITE PLAINS, NEW YORK.

PROCESS OF MANUFACTURING IRON AND STEEL.

No. 911,870.          Specification of Letters Patent.          Patented Feb. 9, 1909.

Application filed October 31, 1905, Serial No. 285,264. Renewed July 6, 1908. Serial No. 442,244.

*To all whom it may concern:*

Be it known that I, CARLETON ELLIS, a citizen of the United States, and a resident of White Plains, in the county of Westchester and State of New York, have invented certain new and useful Improvements in Processes of Manufacturing Iron and Steel, of which the following is a specification.

This invention relates to processes of making iron and consists in a method of treating comminuted iron ores by passing the same in a thin traveling layer through a reverberatory furnace past heat radiating atmospheres and zones of certain particular characteristics while shielded therefrom by reducing atmospheres of certain other characteristics; all as more fully hereinafter pointed out and as claimed.

Fine iron ores, and particularly those which, like certain of the rich magnetites, are relatively free from slag making and sintering impurities, are treated in the blast furnace with much difficulty, and it is never possible to use more than a limited per cent. of such ores in a blast furnace charge.

It is the object of the present invention to treat such rich pulverulent ores, as well as others, by a simple, cheap and ready direct process.

Direct processes, or those operating without the use of a blast furnace and employing flames or reducing atmospheres, have never hitherto been particularly successful. Iron oxids cannot be reduced to metal save by gas atmospheres in which the reducing gases, generally hydrogen or carbon monoxid, exceed a certain percentage of the whole gas mass. Short of this percentage, metallic iron is again oxidized until the amount of reducing gas reaches the critical point. Or, in other words, to permit reduction to metal, the bathing gas mass must not only be reducing but highly reducing. Further, the temperature must be very high, the reaction of reduction going on with diminishing speed as temperatures lower. But these stated conditions are incompatible. No reducing flame can be very hot; great heat is only secured by free combustion in the presence of an excess of oxygen or air. It is for these reasons that direct reduction has heretofore proved rather impractical.

In the present invention however, I have obviated these difficulties by using a separate source of heat in connection with the reducing gas instead of relying on the latter both for heat and for reduction.

According to the present invention, the ore is transmitted in a thin layer or stream along the hearth of a reverberatory furnace, built of the usual refractory materials, any appropriate conveying means or mechanism being used. Above it and blanketing it is produced a layer of reducing gas flowing in the opposite direction. Producer gas is suitable; preferably a dry gas made without the use of steam in the producer since steam and hydrogen, iron and oxid of iron enter into violent reversible reactions as temperatures change and disturb the uniformity of operation. Such a dry gas contains only carbon monoxid as a combustible component and is adapted to secure perfect uniformity. Above this flowing stratum of reducing gas again, is produced a blazing flame of powdered coal or other concentrated flaming fuel, carried in suspension in air and burning with excess of air in heat radiating relationship to the arch of the reverberatory and to the sole whereon travels the ore beneath the reducing stratum. Under these circumstances, the necessary conditions are united. The highly reducing stratum of producer gas bathing the ore furnishes the necessary excess of reductive power and insulates the ore from the oxidizing gases above while the blazing coal flame with its excess of oxygen furnishes the necessary temperature and, in connection with the walls of the reverberatory, radiates heat down upon the ore. Almost any desired temperature can be afforded by such a flame jet of powdered coal burning in free space. The chamber of the reverberatory in which such a high-temperature flame is burning forms a highly heated zone through which the ore travels in intimate contact with highly heated reducing gases and subjected to the intense radiant heat from flame and arch and chamber walls. As the ore travels in a contrary direction to that of the flame and of the current of gas, it is subjected to a constantly increasing reducing action and is thereby methodically reduced. In the first portion of its travel occurs the reduction of ferric oxid to ferrous, which requires a relatively low excess of reducing power in the bathing gas mass, and in the later portion the ferrous oxid is further reduced to metal when in contact with the fresh gas under the hottest part of the blazing flame.

In the accompanying illustration is shown, more or less diagrammatically, apparatus suitable for performing the described process.

Figure 2:
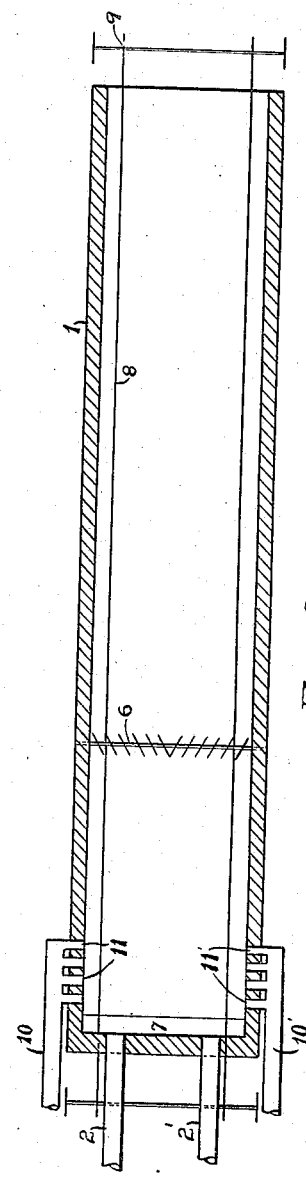

In this illustration: Figure 1 is a vertical longitudinal section of a reducing furnace adapted for treatment of iron ores by this process; and Fig. 2 is a horizontal section of the same.

Like reference characters designate like parts in both views.

In this illustration, 1 is a furnace having the duplicate fuel supply inlets 2 and 2'; chimney stack, 3; ore feed hopper, 4; hearth, 5; rabbles, 6; iron discharge opening, 7; and the rabble drive and pulleys, 8 and 9. Ports 11 and 11' supply reducing gas from pipes 10 and 10' at a point well below the plane of fuel supply through 2. This furnace is, as usual, constructed of refractory material adapted to retain and radiate heat.

From the conditions existing in this apparatus, the air-coal blast entering through 2 forms an intensely hot, blazing flame burning near to, or even in contact with, the roof or arch, heating it to an intense temperature. One great advantage of powdered coal for this flame, apart from its furnishing a blazing heat radiating flame, is that it enables the flame to be somewhat longer, carrying the heat further into the furnace, while still employing for combustion the excess of air needed to generate intense local heat. Where the air carrying the coal is in large amount and less dependence is placed on sheath air, the diminished luminosity or radiance of the flame is compensated for by the increased heat supplied to the arch and walls. From the arch and walls the heat radiates or "shines down" upon the material on the sole of the furnace, as is customary in reverberatories. The position of the twyers 11 and 11', immediately adjacent to the layer of ore, enables the reducing gas stratum to mix directly therewith as a bathing layer, while the intense heat of the products of combustion in the fore part of the furnace renders them specifically light and prevents destruction of the discrete layer of producer gas at this point. As the reducing gas stratum progresses through the furnace, it progressively meets, or becomes admixed with, more and more air, and progressively assumes more of the character of a flame until at the far end of the furnace, complete admixture ensues and the combustible of the producer gas layer is utilized to heat the ore, burning with the excess of air of the coal flame. Preferably the ore is heated before entering the furnace to lessen the demands on the radiant zone.

For the stratum of reducing gas, any suitable gas may be employed, though, as stated, dry producer gas is preferred. However, "blue" water gas, natural gas, or any other gas may be employed.

In detail, with the specific apparatus shown, the process is carried out as follows: Iron ore, preferably rather finely divided, is fed from hopper 4 upon the floor of the furnace and is swept forward by the rabbles 6. Through ports 2 and 2' is admitted a blast of powdered coal carried by an air jet, producing a high-temperature, more or less luminous flame, which sweeps along the declining roof of the furnace, contacting therewith more or less and imparting heat thereto, and finally filling the furnace near the stack outlet 3, through which it departs. At this point it impinges on or contacts with the traveling layer of ore on the floor, heating it both by direct contact and by radiation from the furnace walls. Not much reduction occurs or is desired at this point.

In order to secure the high flame temperature desired, the air carrying the coal may be previously heated, while to prevent too localized a heat development, it may be diluted somewhat with indifferent gases.

Through ports 11 and 11' is supplied a current of reducing gas, preferably dry producer gas, as stated. Entering at a lower plane than the flame jet through 2—2', this gas flows along thereunder, entrained more or less by the blast, towards the stack outlet, gradually becoming mixed with the blast and burning, that is, assuming the character of a flame; and, as a separate stratum, ceasing to exist before the stack is reached. At the point where it disappears as a distinct reducing gas stratum and becomes more of a flame, its combustible constituents add their heat to that of the blast and serve to aid in heating the ore. Before this point is attained however, it is burned more or less, developing more and more heat as it travels, and, of course, becoming less reducing until it disappears. In treating iron ores however, the reductive effect of the gas layer in these latter points of its travel is still great enough to begin the reduction converting the ferric iron into ferrous. The reactions converting ferric oxid first into magnetic oxid and then into ferrous oxid require a much less partial pressure of carbon monoxid or hydrogen than the reaction forming iron from ferrous oxid, and the final, or burning, portions of the lower gas body are in general reducing enough to perform these reactions. The intense heat where the flame and gas commingle is indeed of itself enough to cause some dissociation and form some magnetic oxid.

As reduction by the gas layer occurs, the gaseous oxidation products formed are diverted and swept away by the onflowing gaseous currents, and the ore progressively moves into more and more reducing atmospheres until it finally enters the body of pure gas immediately under the blazing, heat radiating coal flame and its ferrous oxid is reduced to iron.

In Letters Patent No. 803,886, granted to me Nov. 7, 1905, on co-pending application Serial No. 263,889, filed June 5, 1905, I have described and broadly claimed the treatment of iron ores with a highly heated superior flame and an inferior flame or current of a reducing character, the superior flame being produced from producer gas burned with hot air, and this matter I do not here claim, this application relating to an embodiment of the invention in which the superior flame is produced by powdered fuel and the underlying reducing layer first encounters the material as a current and not a true flame.

The finely divided ore may be mixed with fluxing materials, or with catalytic materials to facilitate the reaction, or with carbonaceous material to carburize the iron produced, thereby producing steel or pig iron in lieu of pure iron. Naturally, carbonaceous matter is preferably mixed with the ore at a point beyond that at which the flame and the current blend, to prevent its being consumed. Pig iron and steel, having lower melting points than pure iron, will flow away more readily at the delivery end. Where unmelted iron or steel is produced, because of its finely divided form, it is apt to exhibit pyrophoric properties and be readily oxidizable or combustible, sometimes kindling on contact with air. Therefore I prefer to treat the reduced iron when in this spongy or finely divided state in one of two ways: either to discharge it immediately into an open hearth furnace (not shown) or other furnace in which a batch of molten metal immediately surrounds and dissolves the iron as fast as produced, or to subject the said spongy iron to a gradual cooling in the presence of a reducing gas or of an inert gas, such as nitrogen.

What I claim is:

1. The process of reducing iron which consists in transmitting oxids of iron covered by a body of reducing gases under a blast flame of powdered fuel burning in a refractory walled chamber, said body traveling in a contrary direction to that of the oxids and gradually becoming a flame merging with the other flame.

2. The process of reducing iron which consists in transmitting oxids of iron through a reverberatory furnace under and admixed with a current of reducing gas and producing above such oxids and current and in proximity to the arch of the reverberatory, a blast flame of powdered fuel, said current of reducing gas gradually becoming a flame merging with the blast flame.

3. The process of reducing iron which consists in producing a luminous, heat radiating flame and transmitting past the same a stream of iron oxids shielded from direct contact therewith by a layer of reducing gas, said layer traveling in the contrary direction and gradually becoming a flame merging with the other flame.

4. The process of reducing iron which consists in transmitting oxids of iron covered by a body of dry producer gas under a blast flame of powdered coal in aerial suspension, said body traveling in the contrary direction to the oxids and becoming a flame merging with the blast flame.

5. The process of reducing iron which consists in transmitting oxids of iron, covered and shielded by a layer of reducing gases under and past the arch of a reverberatory furnace, said arch containing a luminous flame of powdered fuel burning in aerial suspension, and said layer traveling in contrary direction to the oxids and becoming a flame merging with the other flame.

6. The process of reducing iron which consists in transmitting oxids of iron mixed with a flux and a carburizing material under a layer of reducing gas traveling in the opposite direction and gradually becoming a flame and producing thereabove a luminous flame of powdered fuel in aerial suspension.

Signed at New York, in the county of New York, and State of New York, this 24th day of Oct. A. D. 1905.

CARLETON ELLIS.

Witnesses:
A. H. VAN NORTWICH,
FLETCHER P. SCOFIELD.